United States Patent
Blauvelt

(10) Patent No.: US 7,711,272 B2
(45) Date of Patent: May 4, 2010

(54) LASER SOURCE FOR A PASSIVE OPTICAL NETWORK

(75) Inventor: Henry A. Blauvelt, San Marino, CA (US)

(73) Assignee: HOYA Corporation USA, San Jose, CA (US)

(*) Notice: Subject to any disclaimer, the term of this patent is extended or adjusted under 35 U.S.C. 154(b) by 579 days.

(21) Appl. No.: 11/562,684

(22) Filed: Nov. 22, 2006

(65) Prior Publication Data

US 2010/0074619 A1    Mar. 25, 2010

Related U.S. Application Data

(60) Provisional application No. 60/739,398, filed on Nov. 23, 2005.

(51) Int. Cl.
*H04B 10/12* (2006.01)
(52) U.S. Cl. ..................................................... 398/197
(58) Field of Classification Search .......... 398/182–201
See application file for complete search history.

(56) References Cited

U.S. PATENT DOCUMENTS

| | | | | |
|---|---|---|---|---|
| 4,982,407 A | | 1/1991 | Murase et al. | |
| 5,140,603 A | * | 8/1992 | Anderson et al. | 372/29.02 |
| 5,448,629 A | * | 9/1995 | Bosch et al. | 398/191 |
| 5,754,577 A | | 5/1998 | Casper et al. | |
| 5,793,782 A | | 8/1998 | Meyrueix | |
| 6,549,316 B2 | * | 4/2003 | Blauvelt | 398/119 |
| 6,917,639 B2 | | 7/2005 | Ishida et al. | |

OTHER PUBLICATIONS

International Search Report and Written Opinion for PCT App. No. PCT/US 06/61235.

* cited by examiner

*Primary Examiner*—Quan-Zhen Wang
(74) *Attorney, Agent, or Firm*—David S. Alavi

(57) ABSTRACT

A method comprises: receiving a RF signal; providing a RF signal level; varying a laser power DC set point linearly with the RF signal level over a selected range; and modulating with the RF signal laser output power about the DC set point. The RF signal level can be RF signal amplitude or RF signal power. An apparatus comprises: a laser; a RF detector adapted to receive the RF signal and to provide the RF signal level; a laser power control circuit coupled to the RF detector and to the laser and adapted to vary the laser power DC set point substantially linearly with respect to the RF signal level over a selected range; and a laser modulator coupled to the laser and adapted to receive the RF signal and to modulate therewith laser output power about the DC set point.

24 Claims, 8 Drawing Sheets

LASER SOURCE FOR A PASSIVE OPTICAL NETWORK

BENEFIT CLAIMS TO RELATED APPLICATIONS

This application claims benefit of U.S. provisional App. No. 60/739,398 filed Nov. 23, 2005 in the name of Henry A. Blauvelt, said provisional application being hereby incorporated by reference as if fully set forth herein.

BACKGROUND

The field of the present invention relates to laser sources. In particular, a laser source for a passive optical network is disclosed herein.

In a typical passive optical network (PON), multiple network termini 102 are connected to a single network node 104 via an optical splitter network 106 (FIG. 1). Downstream optical signals are routed from the network node 104 through the splitter network 106 and reach all of the network termini 102, regardless of the intended target terminus of the signal. Upstream signals originating at a network terminus 102 are transmitted through the splitter network 106 to the network node 104. If upstream optical signals are transmitted from two or more network termini 102 simultaneously, those signals might interfere with one another upon reaching the network node 104, or further upstream from the network node.

Upstream optical signals are typically generated at a network terminus in response to radio-frequency (RF) electrical signals carrying desired information. The upstream optical signal typically comprises some DC optical power level (also referred to as a DC optical set point), with the information carried by optical modulation about the set point. The modulation of the optical signal is typically driven by the corresponding RF electrical signal. The source of the optical signal is typically a laser source or other coherent optical source.

It may be desirable to provide a laser source for use in a passive optical network that reduces the likelihood or severity of interference between simultaneously transmitted upstream optical signals.

SUMMARY

A method comprises: receiving a RF electrical input signal; providing a detected RF signal level corresponding to a detected fraction of the RF electrical input signal; varying a laser power DC set point substantially linearly with respect to the detected RF signal level over a selected range of the detected RF signal level; and modulating with a fraction of the RF electrical input signal output power of the laser about the laser power DC set point. The detected RF signal level can be detected RF signal amplitude or detected RF signal power. An optical apparatus comprises: a laser; a RF detector adapted to receive a fraction of the RF electrical input signal and to provide the corresponding detected RF signal level; a laser power control circuit operatively coupled to the RF detector and to the laser and adapted to vary the laser power DC set point substantially linearly with respect to the detected RF signal level over the selected range of the detected RF signal level; and a laser modulator operatively coupled to the laser and adapted to receive a fraction of the RF electrical input signal and to modulate therewith laser output power about the laser power DC set point.

Objects and advantages pertaining to laser sources suitable for use in a passive optical network may become apparent upon referring to the exemplary embodiments illustrated in the drawings and disclosed in the following written description and/or claims.

The embodiments shown in the Figures are exemplary, and should not be construed as limiting the scope of the present disclosure and/or appended claims.

DETAILED DESCRIPTION OF EMBODIMENTS

Figure 1:
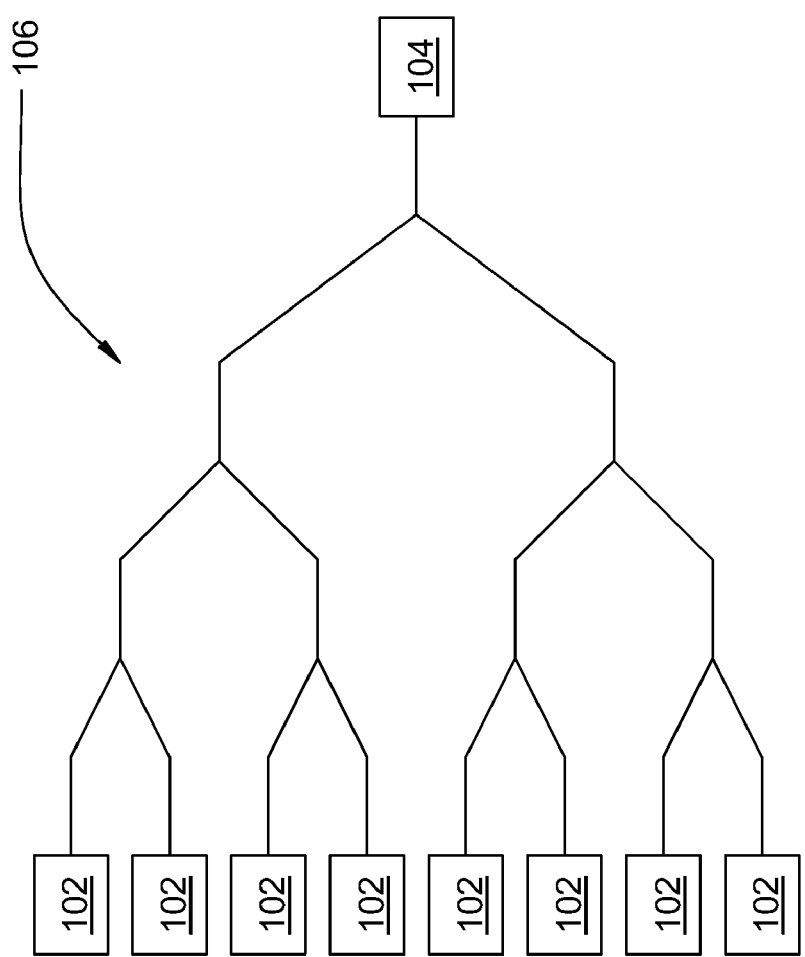
FIG. 1 illustrates schematically a passive optical network including a splitter network.
Figure 2:
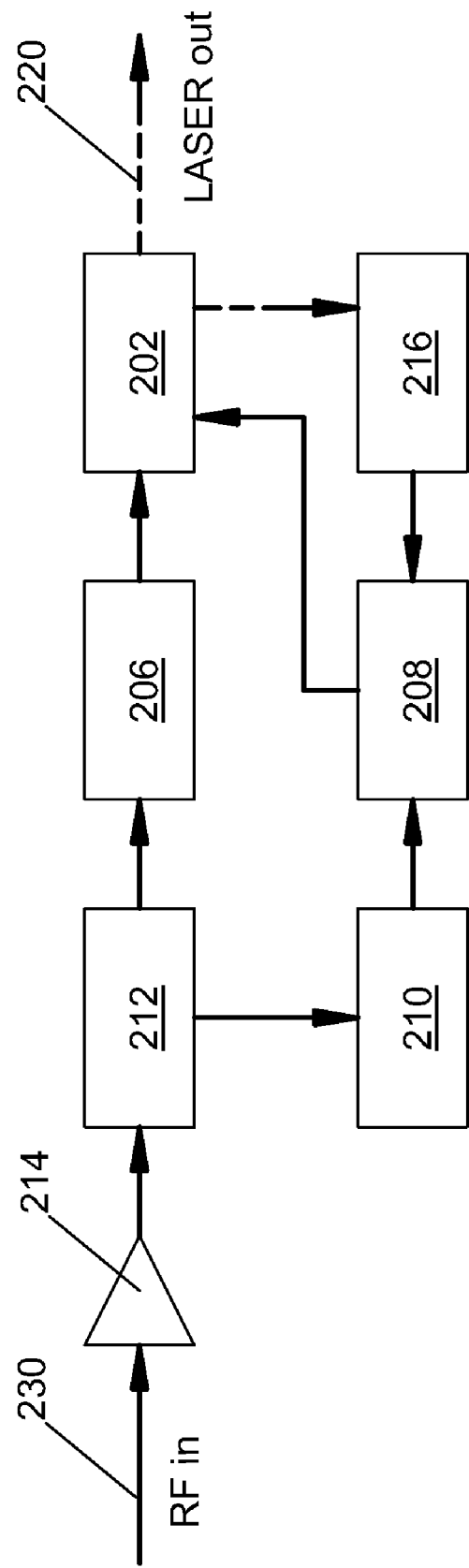
FIG. 2 is a schematic block diagram of an exemplary laser source.

An exemplary embodiment of a laser source is illustrated schematically in the block diagram of FIG. 2. A laser 202 is operatively coupled to a laser power control circuit 208 and laser modulating means 206. Laser 202 may be of any suitable type or configuration; in many instances involving optical networks, laser 202 comprises a laser diode and can further comprise a laser current supply or control of any suitable type or configuration. The laser power control circuit 208 may be of any suitable type or configuration. Laser modulating means 206 is adapted for receiving an incoming RF electrical input signal 230 (or a fraction thereof) and modulating the optical output 220 of laser 202 in response to the RF input signal. Modulating means 206 may comprise: an electrical connection or circuitry directly coupling the RF signal to the laser; an electro-absorption modulator; an electro-optic modulator; an acousto-optic modulator; or any other suitable intra-cavity or extra-cavity modulator. In some instances the laser power control circuit 208 and the modulating means 206 can comprise a common circuit; in other instances the laser power control circuit 208 and modulating means 206 can comprise discrete circuits or subcomponents. A RF amplifier 214 of any suitable type may be employed for amplifying the incoming RF signal 230, if needed or desired. The modulated optical output 220 of laser 202 typically comprises modulations of the laser output power about a DC laser power set point. A monitor photodetector 216 may be employed, if needed or desired, for maintaining a desired DC laser power set point. The monitor photodetector 216, if present, may be of any suitable type or configuration, and may be operatively coupled to the laser 202 or to power control circuit 208 in any suitable way.

A fraction of the incoming RF signal 230 is split off by RF tap 212 and routed to a RF detector 210 operatively coupled to laser power control circuit 208. RF detector 210 may be of any suitable type or configuration. RF tap 212 may be of any suitable type or configuration, including a directional-coupler-type splitter, a resistive tap, or any other suitable tap or splitter. Laser power control circuit 208 (or other power control means) is adapted to vary the laser power DC set point substantially linearly with respect to the detected RF signal level. The detected RF signal level can be either detected RF signal amplitude or detected RF signal power. The laser power control circuit can be further adapted for maintaining optical output power of the laser 202 at a low-power idle level when the detected RF signal level (amplitude or power) is below a threshold RF signal level. These various functions can be achieved by any suitable combination of digital and/or analog circuitry. Specific examples are illustrated schematically in FIGS. 4A and 4B; it should be noted that myriad other circuits may be employed for achieving desired functionality of modulating means 206, power control circuit 208, and laser 202 and any laser control or supply, while nevertheless remaining within the scope of the present disclosure or appended claims.

Figure 4A:
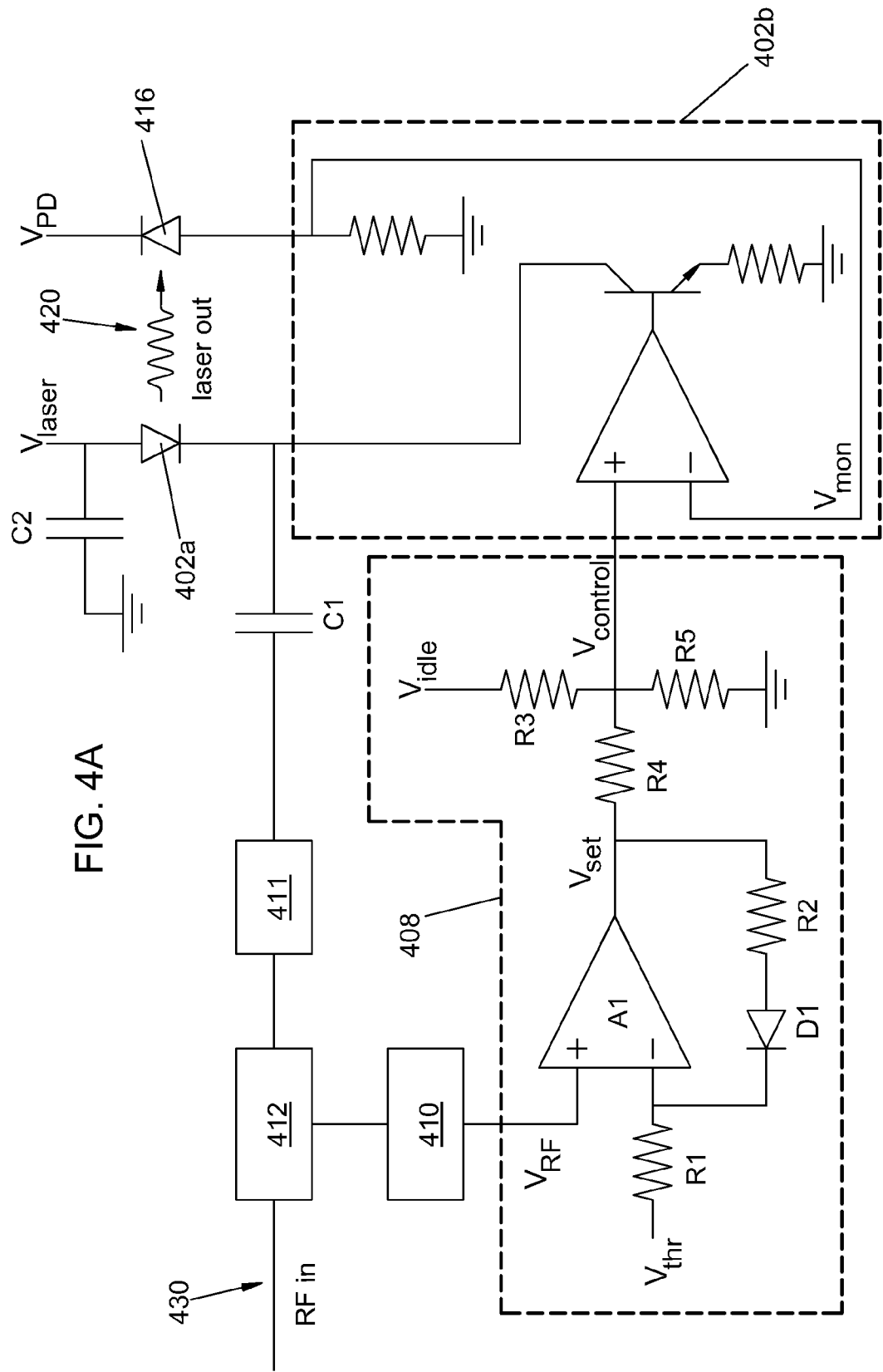
FIGS. 4A and 4B are schematic diagrams of exemplary circuits for controlling a laser source.
Figure 4B:
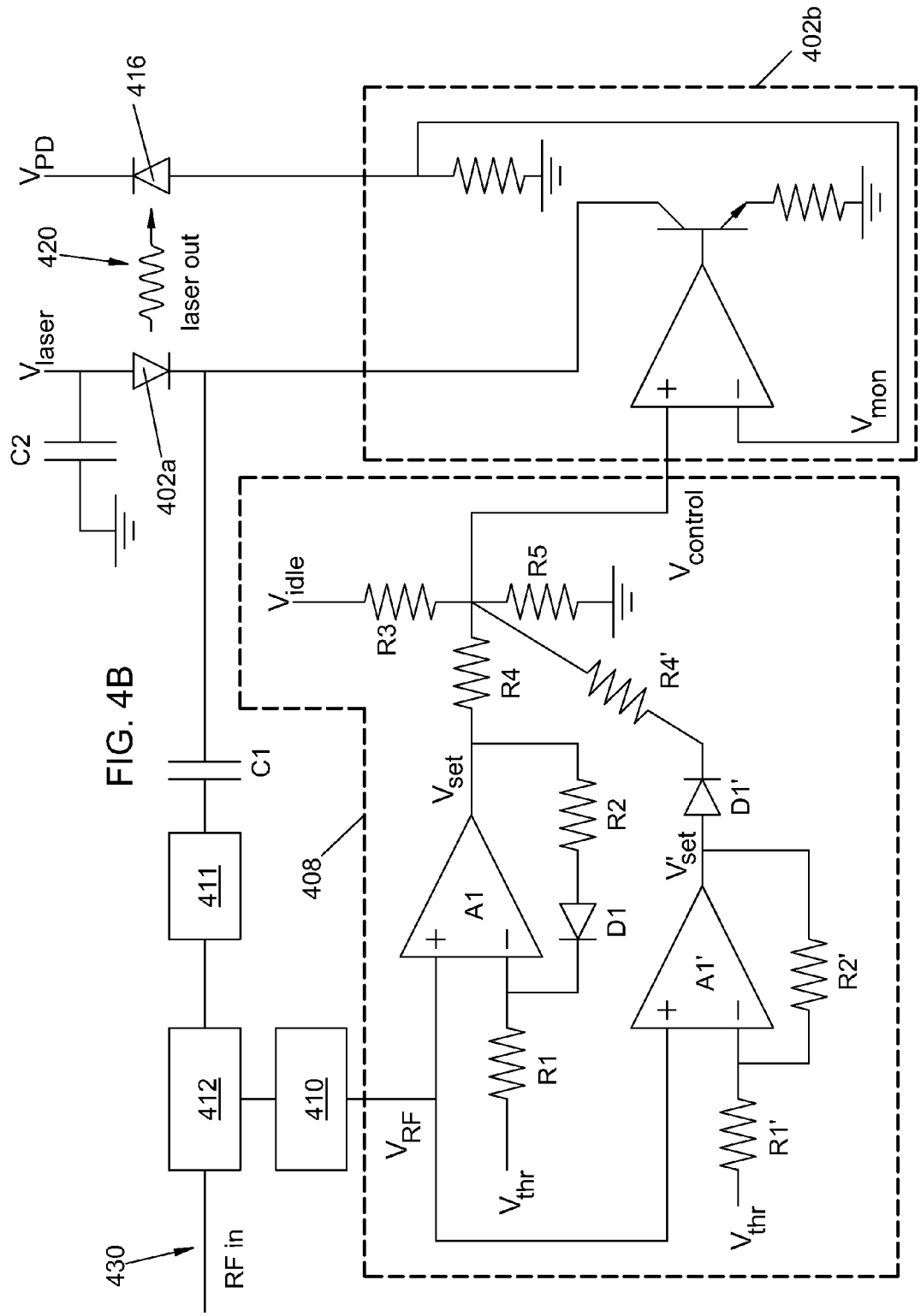

In FIGS. 4A and 4B, an incoming RF signal 430 is split by RF tap 412. A fraction of the RF signal 430 reaches RF detector 410, which is operatively coupled to laser power control circuit 408. A laser current control 402b comprises any suitable circuit for controlling laser drive current through laser diode 402a (the circuit 402b shown in the Figures is exemplary only) and is arranged to provide a DC laser power level that varies approximately linearly with an applied control voltage $V_{control}$ that is provided by the laser power control circuit 408. The remaining fraction of the RF signal 430 is coupled directly to laser diode 402a through an impedance-matching component or network 411 and a capacitor network (C1 and C2 in these examples) for modulating the laser output power; the total laser diode current is the sum of the DC current controlled by laser current control 402b and the RF signal applied to the laser diode 402a. The direct coupling of the RF signal to the laser diode comprises the modulator or modulating means in the exemplary embodiments; any other suitable modulator or modulating means can be employed. RF detector 410 produces a detector voltage $V_{RF}$ approximately proportional to the detected RF signal level, which can be detected RF signal amplitude or detected RF signal power. The impedance-matching component or network 411 typically is employed for matching the low impedance of the laser diode 402a to the impedance characteristics of the RF electrical signal transmission system that transmits RF signal 430 (e.g., 75 ohms for a typical coaxial cable system). Component or network 411 can comprise one or more resistors, one or more transformers, or any other suitable component or network for achieving the desired impedance-matching functionality.

Laser current control 402b in these embodiments comprises a bias control circuit that varies the DC laser drive current allowed to flow through the laser diode 402a. The laser diode 402a is forward-biased by laser bias voltage $V_{laser}$. The DC current allowed to flow through the laser diode 402a varies according to $V_{control}$ and a monitor voltage $V_{mon}$ produced by monitor photodiode 416 (which receives a portion of the laser output power 420 and is reverse-biased by $V_{PD}$ in this example). $V_{control}$ serves as the DC set point control voltage, and the circuit 402b acts to maintain the laser output power (as reflected by $V_{mon}$) at the laser power DC set point. The embodiment of laser current control 402b is only one example of myriad circuits or components that can be employed within the scope of the present disclosure for controlling the DC laser output power.

Figure 5A:
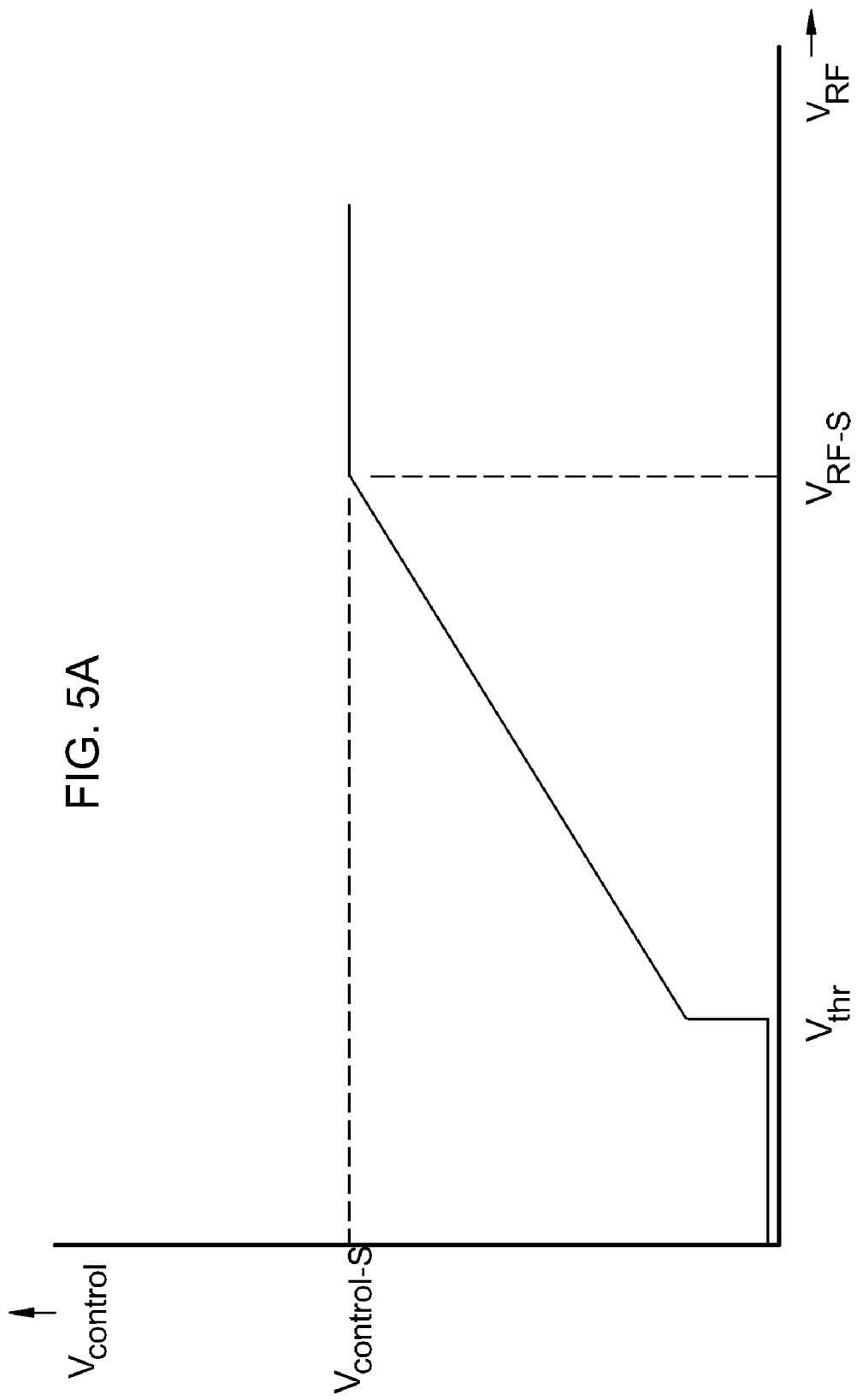
FIGS. 5A and 5B are schematic plots of laser control voltage versus RF detector voltage for the exemplary circuits of FIGS. 4A and 4B, respectively.

The configuration shown in FIG. 4A for power control circuit 408 exhibits a dependence of a laser control voltage $V_{control}$ (and hence the laser power DC set point) on the RF detector voltage $V_{RF}$ substantially as shown in FIG. 5A. When $V_{RF}$ from RF detector 410 is below a selected RF threshold voltage $V_{thr}$, the power control circuit 408 supplies a low-level control voltage to the laser current control 402b. This low-level voltage results in a low-power idle level for the output of the laser diode 402a. Diode D1 causes the laser control voltage $V_{control}$ to increase abruptly to the turn-on voltage of diode D1 as $V_{RF}$ increases through $V_{thr}$. When $V_{RF}$ exceeds the selected threshold voltage $V_{thr}$, the voltage supplied by the power control circuit 408 to the laser current control 402b varies substantially linearly with the RF detector voltage $V_{RF}$ over a selected range of $V_{RF}$ from about $V_{thr}$ to a saturation input voltage $V_{RF-S}$. At the saturated input voltage, the corresponding saturated control voltage is $V_{control-S}$. The slope of the linear portion of the dependence of $V_{control}$ on $V_{RF}$ typically is substantially determined as known in the art by the operating characteristics of the operational amplifier A1 and the values of one or more of the resistors R1-R5 (and may also depend on other circuit elements not shown on the Figures), and a desired slope can be obtained by suitable adjustment of those parameters. The saturation voltages typically are also determined in part by those parameters and can also depend on a supply voltage used to power the power control circuit 408.

The power control circuit can be operated so that when little or no RF signal is present at the RF detector 410, the laser output power is kept at a low level or turned off. This reduces the overall amount of laser power propagating upstream through the splitter network of the passive optical network, thereby reducing the likelihood or the severity of interference between upstream optical signals originating from different network termini. The power control circuit 408 can be adapted for turning off the laser when no RF signal is present or when the RF signal is below a selected threshold signal level (e.g. by reducing laser diode current below the lasing threshold). Alternatively, it may be desirable for the laser to remain above the lasing threshold but at a reduced idle power when the RF signal is absent or below the threshold signal level, e.g., so that the turn-on time for the laser or its controller might be shorter when a RF signal does appear. The threshold voltage $V_{thr}$ can be selected so that the laser remains at its low-level idle power in the presence of stray sources of RF interference, but rises to a higher transmitting laser power DC set point when a RF electrical signal exceeding the RF threshold signal level reaches the RF detector. Depending on necessary or desirable performance characteristics for the laser power control circuit 408, $V_{thr}$ can be set approximately at zero, or can be set at any suitable non-zero value.

The laser power DC set point should be sufficiently large so that modulations thereof by the RF signal are not clipped or otherwise distorted. It may also be desirable, however, to limit overall laser output power so as to reduce the likelihood or severity of interference between independent upstream optical signals in a passive optical network. This is achieved by increasing the laser power DC set point monotonically with respect to an increasing detected RF signal level. Substantially linear or substantially proportional variation of the laser power DC set point with respect to the detected RF amplitude or power can be employed, for example, when the detected RF signal level exceeds a selected RF threshold signal level. In the exemplary power control circuit 408 shown in FIG. 4A, the $V_{control}$ varies substantially linearly with $V_{RF}$ over the selected operational range from about $V_{thr}$ to about $V_{RF-S}$. A desired slope may be selected by suitable choice of operationally amplifier A1 and one or more of the resistors R1-R5 to limit the overall transmitted optical power to only enough to ensure that the laser power DC set point is sufficiently high for a given RF modulation level.

Other types of lasers may be employed, and other types of modulation of the laser may be employed. Other circuit types or circuit configurations may be employed for providing the functionality of power control circuit 408 or laser current control 402b. Any suitable substantially monotonic dependence of the DC optical output power level versus the detected RF signal level may be employed, including substantially proportional variation, substantially linear variation, or other substantially monotonic variations.

Figure 5B:
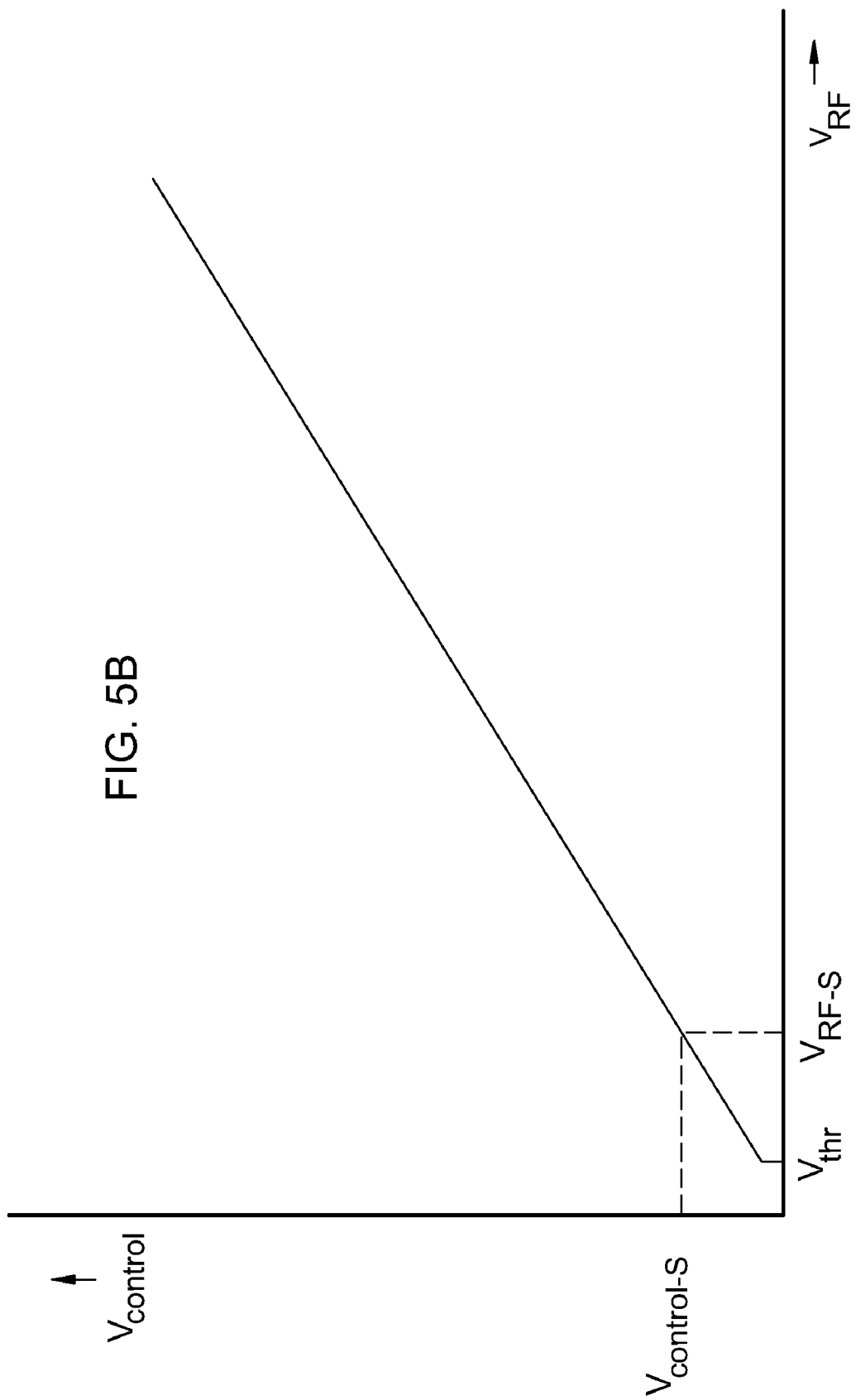

The alternative configuration shown in FIG. 4B for power control circuit 408 exhibits a dependence of a laser control voltage $V_{laser}$ on the RF detector voltage $V_{RF}$ substantially as shown in FIG. 5B, and exhibits a larger operational range of $V_{RF}$ over which $V_{control}$ varies substantially linearly with respect to $V_{RF}$. In the circuit of FIG. 4A, the dynamic range of $V_{control}$ is limited to the ratio of $V_{control-S}$ the turn-on voltage of diode D1. For commonly employed component values and supply voltage, e.g., supply voltage of 5 V and about 0.6 V for the D1 turn-on voltage, the resulting dynamic range is only about 8. The circuit of FIG. 4B includes a second operational amplifier A2 and resistors R1'-R5'. For $V_{RF}$ below the saturation value, the power control circuit 408 of FIG. 4B behaves substantially similarly to that of FIG. 4A. Resistor R4' and the turn-on voltage for diode D1' are chosen so that the second operational amplifier begins to supply current through resistor R4' just as the output of the first operational amplifier saturates. The resistors R1' and R2' can be chosen so that the slope remains approximately constant as the saturation point of the first operational amplifier is passed, as shown in FIG. 5B, or to yield a different slope if needed or desired. In this way the dynamic range of the control circuit 408 can be increased to about 50, for example, before the output of the second operational amplifier also saturates. (Note the difference in scale between FIGS. 5A and 5B.)

Figure 3:
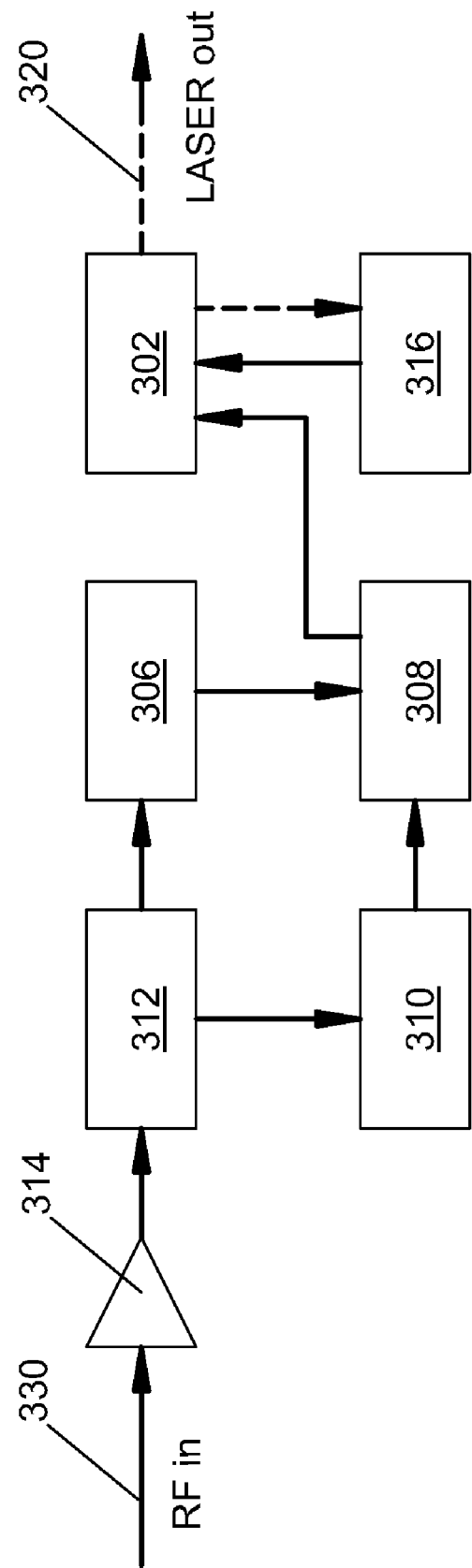
FIG. 3 is a schematic block diagram of an exemplary laser source.

Another exemplary embodiment of a laser source is illustrated schematically in the block diagram of FIG. 3. A laser 302 is operatively coupled to modulating means 306 through a modulation suppressing means 308. Laser 302 may be of any suitable type or configuration, including a laser diode with a laser current supply or control. Modulating means 306 may comprise any modulator, electrical connection or circuitry, or other means described herein, is adapted for receiving an incoming RF electrical signal 330 and modulating the optical output 320 of laser 302 in response to the RF signal. Modulation suppressing means 308 may comprise a modulator suppression circuit or other means of any suitable type or configuration. A RF amplifier 314 may be employed for amplifying the incoming RF signal 330, if needed or desired. The modulated optical output 320 of laser 302 typically comprises modulations of the laser output power about a DC set point optical power level. A monitor photodetector 316 may be employed for maintaining a desired DC optical power set point, if needed or desired. The monitor photodetector 316, if present, may be of any suitable type or configuration, and may be operatively coupled to the laser 302 in any suitable way.

A fraction of the incoming RF signal 330 is split by RF tap 312 and routed to a RF detector 310 operatively coupled to modulator suppressing means 308. RF tap 312 and RF detector 310 may be of any suitable type or configuration. Modulation suppressing means 308 is adapted for suppressing modulation of the optical output of the laser when detected RF power is below a threshold RF power level. This function may be achieved by any suitable combination of digital and/or analog circuitry. One specific example of a modulator suppression circuit is shown in the circuit diagram of FIG. 6; it should be noted that myriad other circuits may be employed for achieving the desired functionality of suppressing modulation of the laser while nevertheless remaining within the scope of the present disclosure. It should be noted that the exemplary circuit of FIG. 6 includes elements comprising a power control circuit and a laser bias control circuit (as in FIGS. 2, 4A, and 4B). DC laser power control functionalities and modulation suppression functionality may be implemented together or independently in any given embodiment.

Figure 6:
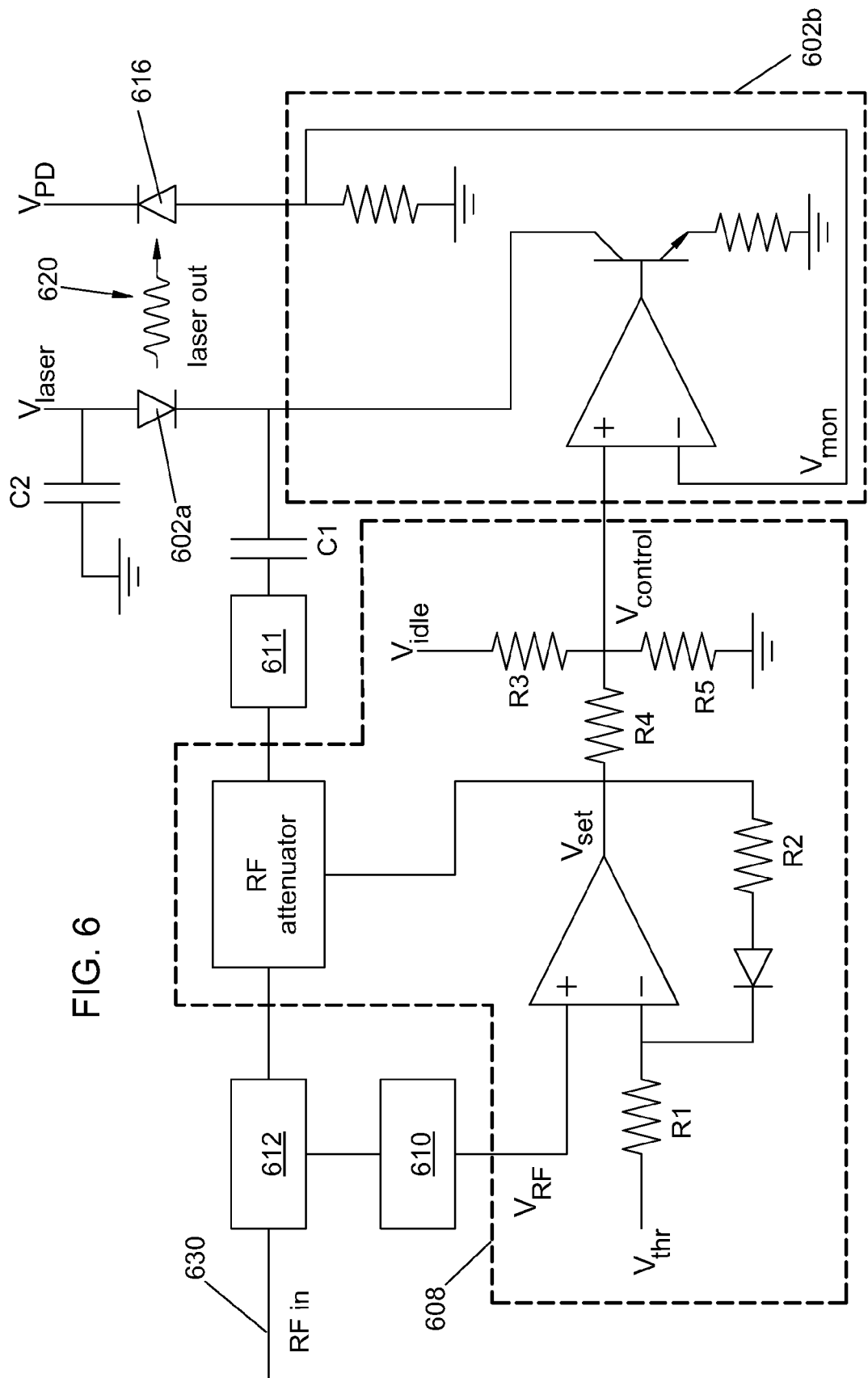
FIG. 6 is a schematic diagram of an exemplary circuit for controlling a laser source.

In FIG. 6, an incoming RF signal 630 is split by RF splitter 612. A fraction of the RF signal 630 reaches RF detector 610, which is operatively coupled to modulator suppression circuit 608. The remainder of the RF signal 630 is coupled directly to laser diode 602a (which is driven by laser current control 602b, substantially similar in operation to circuit 402b) through modulator suppression circuit 608, impedance-matching component or network 611, and a capacitor network (C1 and C2) for modulating the laser output power. The direct coupling of the RF signal to the laser diode comprises the modulator or modulating means in this exemplary embodiment. The modulator suppression circuit in this example comprises a RF attenuator responsive to output of RF detector 610. When the voltage of RF detector 610 is below a selected RF threshold voltage $V_{thr}$, the modulator suppression circuit 608 attenuates the RF signal reaching the laser diode 602a, thereby suppressing modulation of the optical output of the laser. The modulator suppression circuit 608 may include any suitable type of RF attenuator; RF attenuation may be substantially binary (maximal RF attenuation when detector voltage below $V_{thr}$, minimal RF attenuation when detector voltage exceeds $V_{thr}$), or may vary substantially continuously with the RF detector voltage. By attenuating the RF signal reaching the laser diode 602a when the RF signal is below a threshold level, fluctuations in the laser output due to stray source(s) of RF interference may be reduced or substantially eliminated. The threshold voltage $V_{thr}$ may be selected so that attenuation of the RF signal remains high in the presence of stray sources of RF interference, but is reduced or eliminated when a RF electrical signal reaches the RF detector. Other laser types, circuit types or circuit configurations may be employed for providing the functionality of modulation suppression circuit 608.

The exemplary apparatus and methods disclosed herein can be employed in passive optical networks carrying analog RF signals, digital RF signals, or RF signals in both formats, and may be of particular utility in passive optical networks transmitting analog RF signals. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising", "including", "having", and variants thereof shall be construed as open ended terminology, with the same meaning as if the phrase "at least" were appended after each instance thereof.

What is claimed is:

1. An optical apparatus comprising:
   a laser;
   a RF detector adapted to receive a fraction of a RF electrical input signal and to provide a corresponding detected RF signal level;

a laser power control circuit operatively coupled to the RF detector and to the laser and arranged to (i) vary a laser power DC set point substantially linearly with respect to the detected RF signal level over a first selected range of the detected RF signal level and (ii) decrease the laser power DC set point to a laser power idle level over a second selected range of the detected RF signal level, wherein the second selected range is lower in detected RF signal level than the first selected range and the laser power idle level is less than the linearly varied laser power DC set point; and a laser modulator operatively coupled to the laser and adapted to receive a fraction of the RF electrical input signal and to modulate therewith laser output power about the laser power DC set point.

2. The apparatus of claim 1 wherein the detected RF signal level is detected RF signal amplitude.

3. The apparatus of claim 1 wherein the detected RF signal level is detected RF signal power.

4. The apparatus of claim 1 wherein a slope of the substantially linear variation of the laser power DC set point with respect to the detected RF signal level is selected so that distortion or clipping of the modulation of the laser output power is substantially avoided over the first selected range of the detected RF signal level.

5. The apparatus of claim 1 wherein:

the laser comprises a laser diode and a laser current control that supplies a DC laser current so that the laser power DC set point varies substantially linearly with an applied laser control voltage; and the laser power control circuit comprises (i) an operational amplifier connected to receive a RF detector voltage corresponding to the detected RF signal level and to apply the laser control voltage to the laser current control and (ii) a resistor and diode network arranged to yield a selected slope of a substantially linear variation of the applied laser control voltage with respect to the RF detector voltage over the first selected range and to set the laser control voltage to a laser control idle voltage over the second selected range, the laser control idle voltage corresponding to the laser power idle level.

6. The apparatus of claim 5 wherein the slope of the substantially linear variation of the applied laser control voltage with respect to the RF detector voltage yields a slope of the substantially linear variation of the laser power DC set point with respect to the detected RF signal level so that distortion or clipping of the modulation of the laser output power is substantially avoided over at least a portion of the first selected range of the detected RF signal level.

7. The apparatus of claim 5 wherein the laser power control circuit further comprises (i) a second operational amplifier connected to receive the RF detector voltage and to apply the laser control voltage to the laser current control and (ii) a second resistor and diode network arranged to yield a selected slope of the substantially linear variation of the applied laser control voltage with respect to the RF detector voltage over a portion of the first selected range of the detected RF signal level where the control voltage applied by the first operational amplifier is saturated.

8. The apparatus of claim 1 wherein the laser comprises a laser diode and the laser modulator comprises direct connection of the received RF electrical input signal to the laser diode.

9. The apparatus of claim 1 wherein the laser modulator comprises an electro-absorption modulator, an electro-optic modulator, an acousto-optic modulator, an intra-cavity modulator, or an extra-cavity modulator.

10. The apparatus of claim 1 wherein the laser power idle level is non-zero.

11. A method comprising:

receiving a RF electrical input signal;

providing a detected RF signal level corresponding to a detected fraction of the RF electrical input signal;

varying a laser power DC set point substantially linearly with respect to the detected RF signal level over a first selected range of the detected RF signal level;

decreasing the laser power DC set point to a laser power idle level over a second selected range of the detected RF signal level, wherein the second selected range is lower in detected RF signal level than the first selected range and the laser power idle level is less than the linearly varied laser power DC set point; and modulating with a fraction of the RF electrical input signal output power of the laser about the laser power DC set point.

12. The method of claim 11 wherein the detected RF signal level is detected RF signal amplitude.

13. The method of claim 11 wherein the detected RF signal level is detected RF signal power.

14. The method of claim 11 wherein a slope of the substantially linear variation of the laser power DC set point with respect to the detected RF signal level is selected so that distortion or clipping of the modulation of the laser output power is substantially avoided over the first selected range of the detected RF signal level.

15. The method of claim 11 wherein:

the laser comprises a laser diode and a laser current control that supplies a DC laser current so that the laser power DC set point varies substantially linearly with an applied laser control voltage;

varying a laser power DC set point substantially linearly with respect to the detected RF signal comprises (i) receiving a RF detector voltage corresponding to the detected RF signal level in the first selected range at an operational amplifier and (ii) applying with the operational amplifier the laser control voltage to the laser current control, wherein a resistor and diode network yields a selected slope of a substantially linear variation of the applied laser control voltage with respect to the RF detector voltage;

decreasing the laser power DC set point to the laser power idle level comprises (i) receiving a RF detector voltage corresponding to the detected RF signal level in the second selected range at the operational amplifier and (ii) applying with the operational amplifier and the resistor and diode network a laser control idle voltage to the laser current control, the laser control idle voltage corresponding to the laser power idle level.

16. The method of claim 15 wherein the slope of the substantially linear variation of the applied laser control voltage with respect to the RF detector voltage yields a slope of the substantially linear variation of the laser power DC set point with respect to the detected RF signal level so that distortion or clipping of the modulation of the laser output power is substantially avoided over at least a portion of the first selected range of the detected RF signal level.

17. The method of claim 15 wherein varying a laser power DC set point substantially linearly with respect to the detected RF signal further comprises (i) receiving the RF detector voltage at a second operational amplifier and (ii) applying with the second operational amplifier the laser control voltage to the laser current control, wherein a second resistor and diode network yields a selected slope of a substantially linear variation of the applied laser control voltage with respect to the RF detector voltage over a portion of the first selected range of the detected RF signal level where the control voltage applied by the first operational amplifier is saturated.

18. The method of claim 11 wherein the laser comprises a laser diode and modulating the laser comprises directly applying a fraction of the received RF electrical input signal to the laser diode.

19. The method of claim 11 wherein the laser is modulated with an electro-absorption modulator, an electro-optic modulator, an acousto-optic modulator, an intra-cavity modulator, or an extra-cavity modulator.

20. The method of claim 11 wherein the laser power idle level is non-zero.

21. An optical apparatus, comprising:
   a laser;
   means for receiving a fraction of a RF electrical input signal and for providing a corresponding detected RF signal level;
   means for varying a laser power DC set point substantially linearly with respect to the detected RF signal level over a first selected range of the detected RF signal level;
   means for decreasing the laser power DC set point to a laser power idle level over a second selected range of the detected RF signal level, wherein the second selected range is lower in detected RF signal level than the first selected range and the laser power idle level is less than the linearly varied laser power DC set point; and
   means for receiving a fraction of the RF electrical input signal and for modulating therewith output power of the laser about the laser power DC set point.

22. The apparatus of claim 21 wherein the detected RF signal level is detected RF signal amplitude.

23. The apparatus of claim 21 wherein the detected RF signal level is detected RF signal power.

24. The apparatus of claim 21 wherein the laser power idle level is non-zero.

* * * * *